Figure 1:
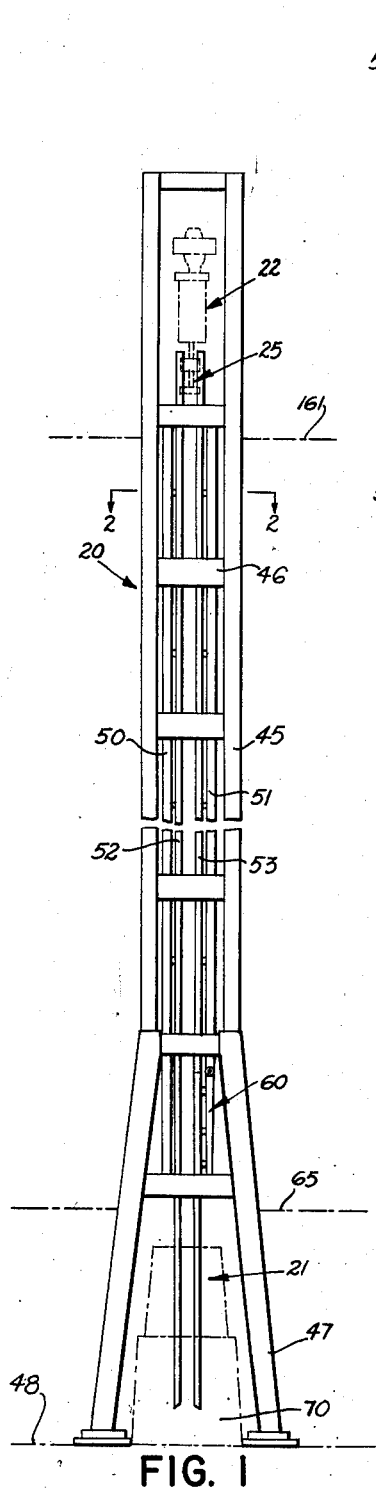

Sept. 18, 1956 W. H. HOPPMANN II 2,763,148
APPARATUS FOR MAKING IMPACT TESTS
Filed Dec. 8, 1948 5 Sheets-Sheet 1

INVENTOR.
WILLIAM H. HOPPMANN II
BY *M. C. Hayes*
ATTORNEY

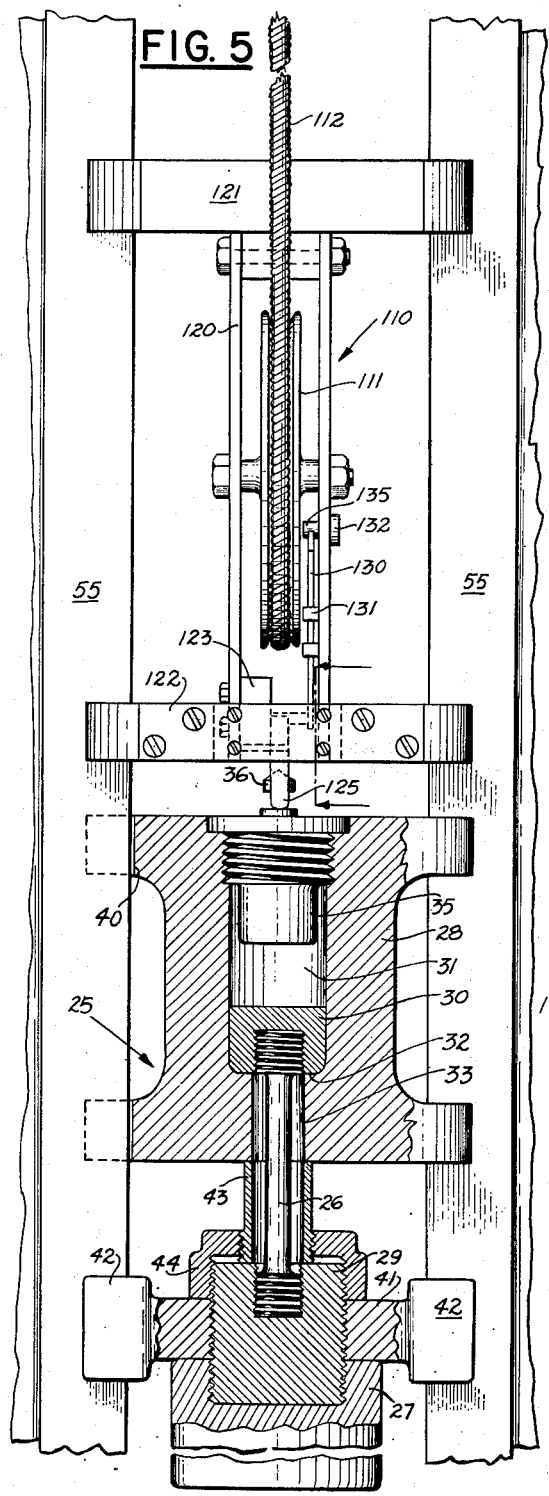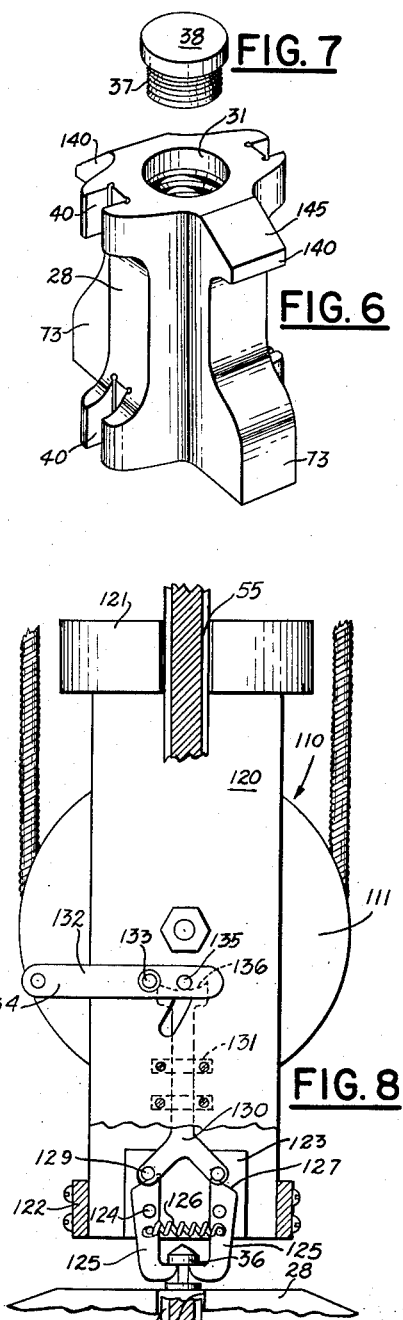

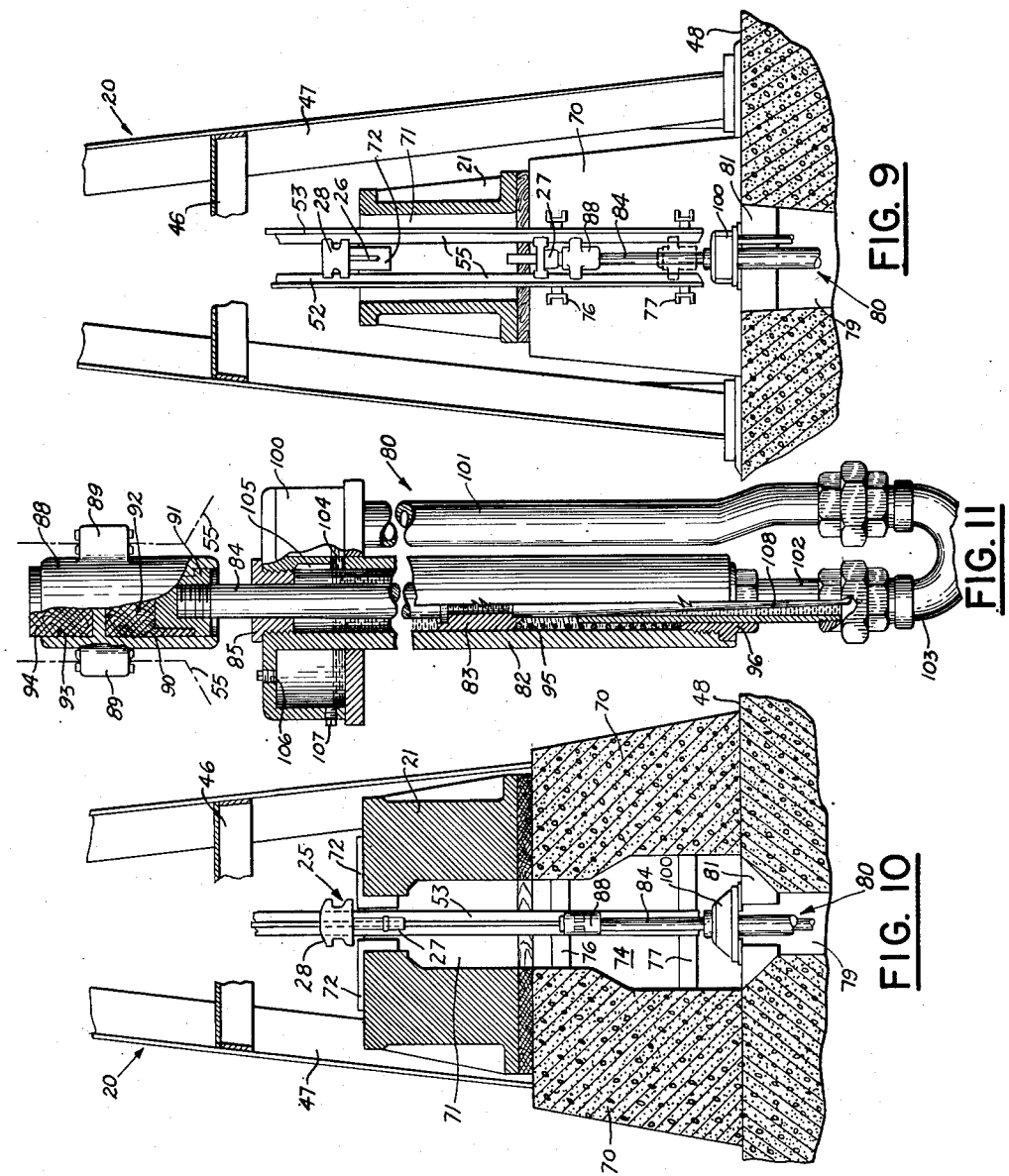

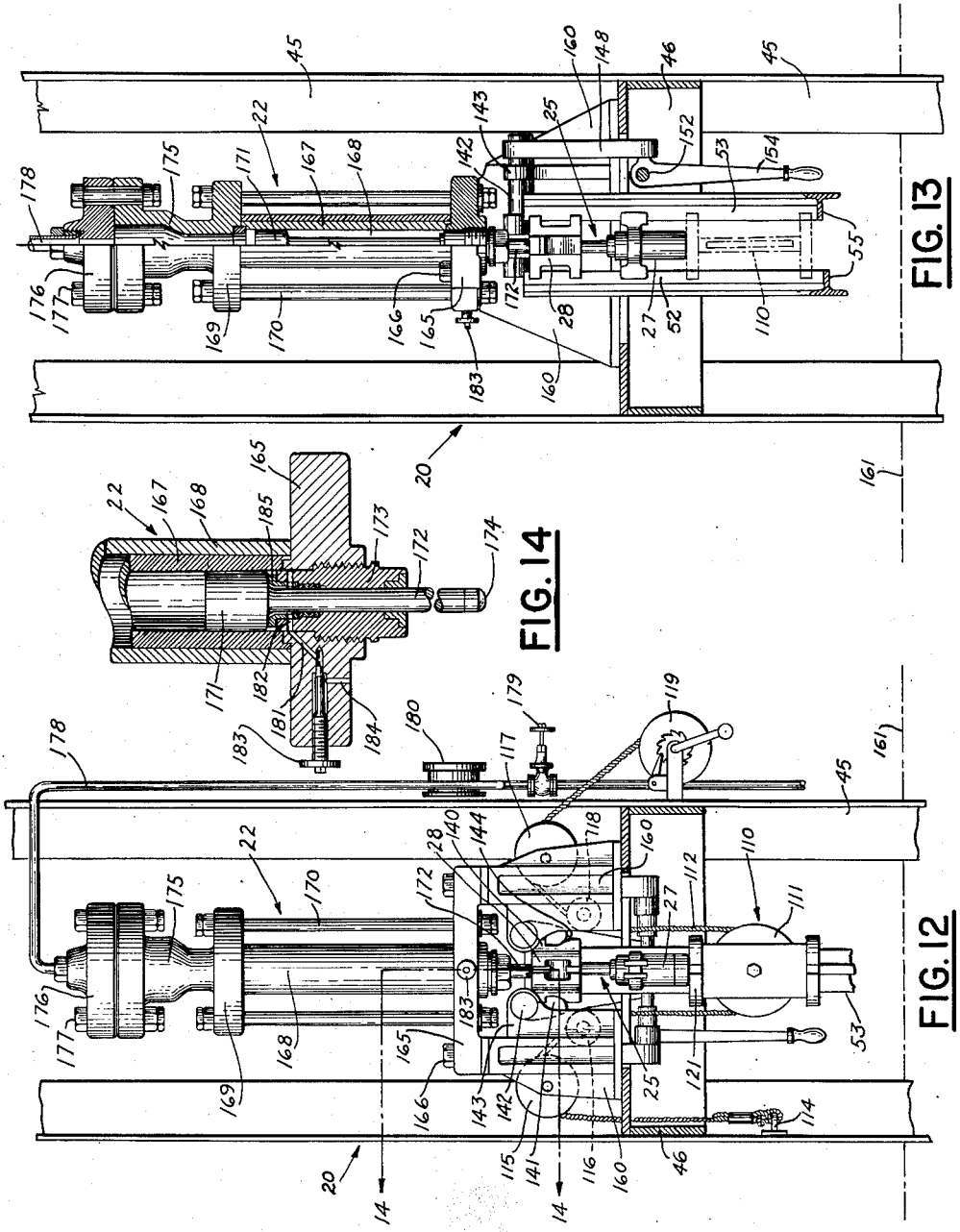

Sept. 18, 1956   W. H. HOPPMANN II   2,763,148
APPARATUS FOR MAKING IMPACT TESTS
Filed Dec. 8, 1948   5 Sheets-Sheet 5

INVENTOR.
WILLIAM H. HOPPMANN II
BY *M. O. Hayes*
ATTORNEY

United States Patent Office 2,763,148
Patented Sept. 18, 1956

2,763,148

APPARATUS FOR MAKING IMPACT TESTS

William H. Hoppmann II, Baltimore, Md.

Application December 8, 1948, Serial No. 64,066

13 Claims. (Cl. 73—12)

(Granted under Title 35, U. S. Code (1952), sec. 266)

The invention described herein may be manufactured and used by or for the Government of the United States of America for governmental purposes without the payment of any royalties thereon or therefor.

This application is a continuation in part of my copending prior application, Serial No. 617,900, filed September 21, 1945, for an Impact Tester, which is now abandoned.

This invention pertains to the art of testing materials, and it comprises apparatus operable to apply high-velocity tensile stress to a specimen of material being tested. The apparatus of the invention is adapted to test materials for tensile strength under impact load.

Attention is directed to the accompanying drawing which discloses a practical embodiment of the invention, and from which a complete understanding of the principles and operation of the invention will be derived. In the drawings—

Figure 3:
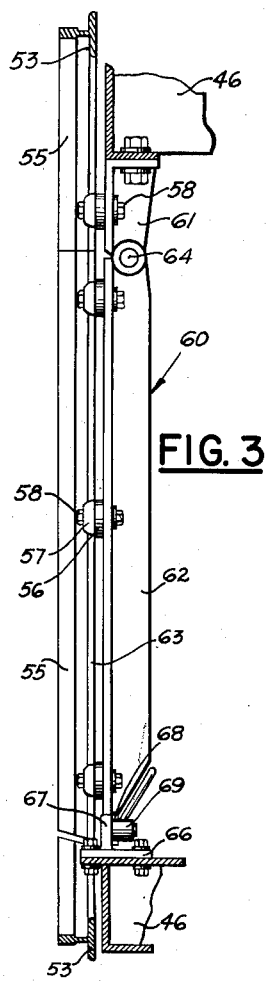
Figure 4:
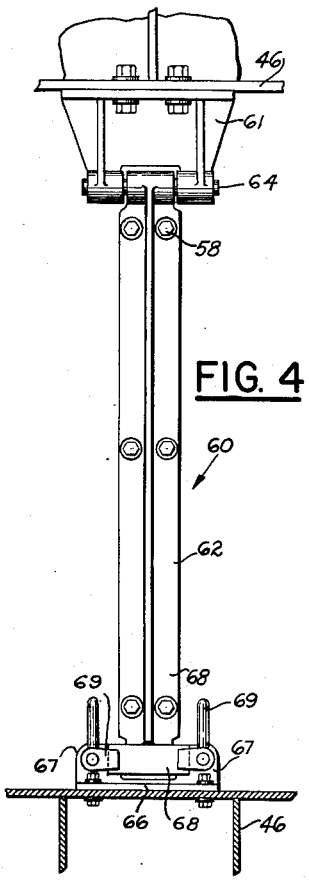
Figure 2:
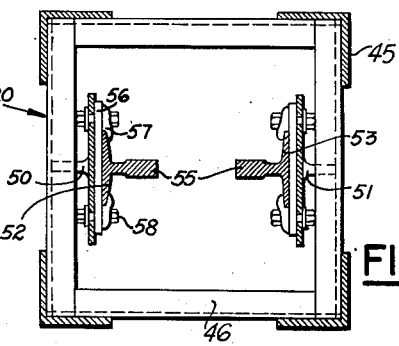
Figure 15:
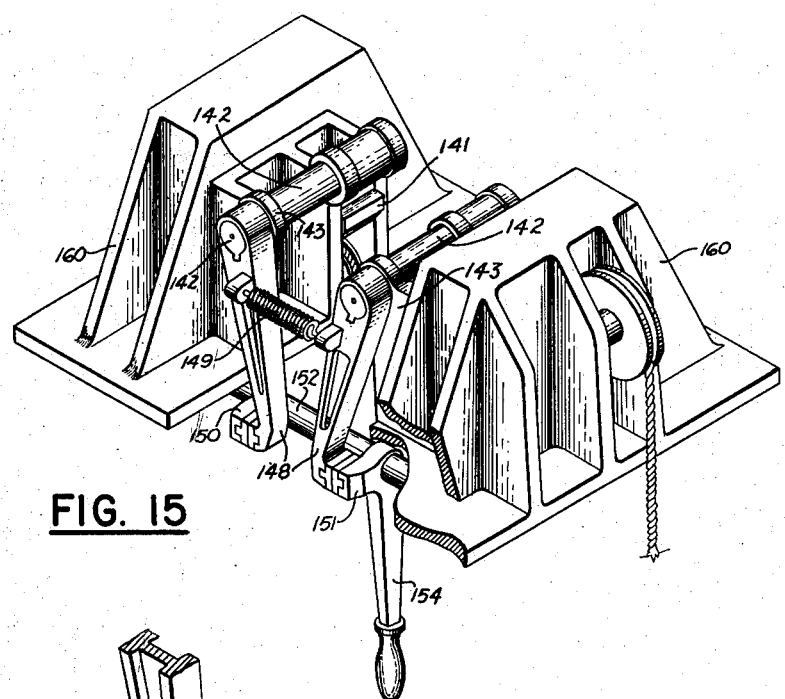
Figure 16:
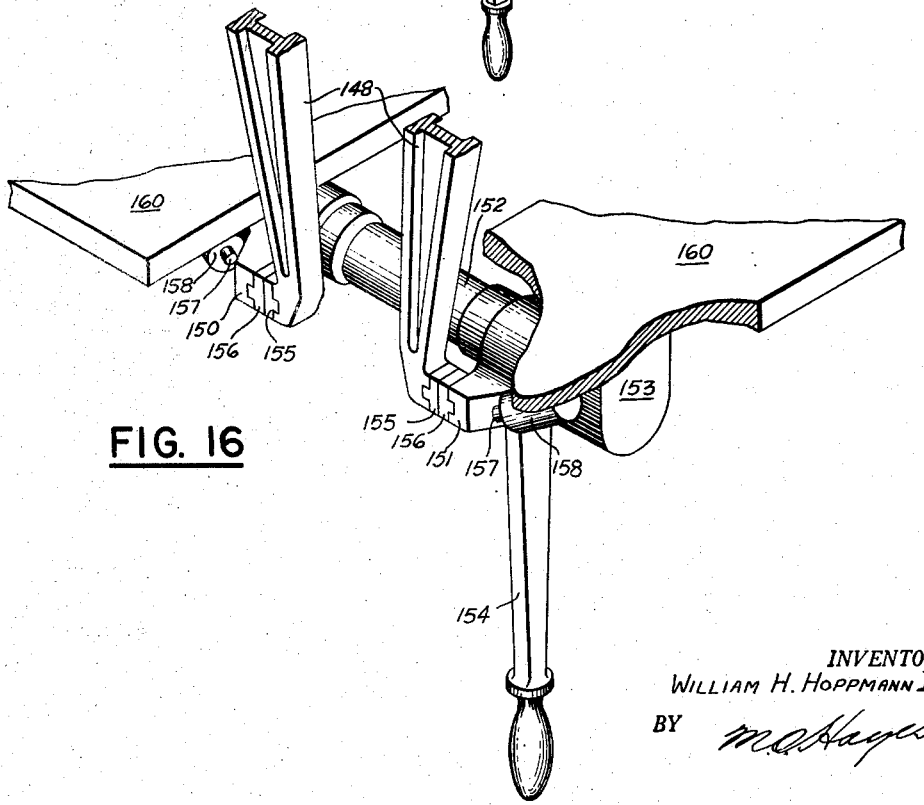

Fig. 1 is an elevation of apparatus embodying the present invention, illustrating the arrangement of its components, Fig. 2 is a cross-sectional plan, taken on line 2—2 of Fig. 1, Fig. 3 is a fragmentary elevation of the apparatus of Fig. 1, illustrating a detail thereof, Fig. 4 is an elevation of the detail of Fig. 3, viewed from the right thereof, Fig. 5 is a fragmentary elevation of the apparatus of Fig. 1, particularly illustrating the elevator and the specimen assembly lifted thereby, Fig. 6 is a perspective of the hammer, which constitutes a component of the specimen assembly, Fig. 7 is a perspective of a closure plug for the hammer of Fig. 6, Fig. 8 is a fragmentary elevation viewed from the right of Fig. 5, particularly illustrating the elevator with parts broken away, Fig. 9 is a fragmentary cross-sectional elevation taken in front of the longitudinal center plane of the apparatus, illustrating structure at the base thereof in greater detail than in Fig. 1, Fig. 10 is a fragmentary elevation taken with parts broken away, illustrating structure at the base of the apparatus from the left in Fig. 9, Fig. 11 is a fragmentary elevation, illustrating the shock absorber in detail, and partially in cross-sectional elevation taken on the longitudinal center plane thereof, Fig. 12 is a fragmentary elevation, illustrating structure at the top of the apparatus, certain parts being broken away for clearness of illustration, Fig. 13 is a fragmentary elevation, illustrating structure shown in Fig. 12 viewed from the right thereof, with parts being broken away for clearness of illustration, the driving engine for the specimen assembly being viewed partially in cross-sectional elevation taken on its longitudinal center plane, Fig. 14 is a fragmentary cross-sectional elevation of the driving engine, taken on line 14—14 of Fig. 13, Fig. 15 is a fragmentary perspective of the release mechanism at the top of the apparatus, and Fig. 16 is a fragmentary perspective of a portion of the release mechanism illustrated in Fig. 15.

Apparatus in general

Apparatus of the invention is embodied in a machine that comprises a tower, Fig. 1, generally designated 20. The machine enables a specimen of material being tested to be dropped from any of a plurality of predetermined heights in the tower 20 to the base thereof, where it is subjected to the desired impact tensile stress by striking the anvil 21. Under acceleration of gravity the specimen attains a predetermined velocity when it reaches the anvil 21, the velocity being determined by the height from which the drop is made. By this means the magnitude of impact stress is controlled.

Under alternative practice, the specimen is driven downwardly towards the anvil 21 with a predetermined initial velocity, the motor 22 being provided for the purpose. When the specimen reaches the anvil 21 after being driven by motor 22, it is traveling at a predetermined higher velocity than is attainable by free fall. Correspondingly greater impact magnitudes are attained thereby.

Specimen assembly

For testing a given material, a specimen 26 thereof is embodied in a specimen assembly, generally designated 25, the structure of the specimen assembly being particularly adapted to making tensile tests by means of the machine of the present invention. One practical embodiment of a specimen assembly 25 is illustrated in Fig. 5.

The specimen assembly 25 comprises a mass of predetermined magnitude attached to each of opposite ends of the specimen 26, one mass being embodied in the weight 27, and the other in the hammer or tup 28. The specimen assembly 25 is positioned in the tower 20 oriented with the weight 27 directed downwardly, and is dropped with the weight 27 in advance and the hammer 28 in trailing position. When the specimen assembly 25 reaches the bottom of the tower where it has attained the predetermined desired velocity, the trailing end of the specimen 26 is arrested by the hammer 28 striking the anvil 21, and the advance mass 27 continues to travel under its momentum, thereby to apply tensile stress to the material of specimen 26.

Attachment of the weight 27 to the specimen 26 at one end thereof is by any suitable means such as the adaptor plug 29, for example. The mass of the weight 27 is variable for adjustment to any suitable magnitude, and this is preferably done by replacement with a weight 27 of different size. At its opposite end the specimen 26 is connected to the tup or hammer 28 in any suitable manner for example, by means of the sub-tup 30 that constitutes a block which fits loosely in the elongated cavity 31 of the hammer 28, and seats against shoulder 32 at one end of cavity 31 as shown. The aperture 33 extends to the exterior of the hammer 28 from cavity 31 at its shoulder 32, the aperture 33 being of a size to permit the specimen 26 to be projected through it into attaching engagement with the block 30.

The cavity 31 is closed at its end opposite the shoulder 32 by the plug 35, which is removable for access to block 30 when the specimen 26 is attached to or detached from the hammer 28. The plug 35 is provided with the button 36 that is used to lift the specimen assembly 25 in the tower 20. A different type plug 37, Fig. 7, that comprises the abutment face 38, is preferably used when the test drop is to be made from the top of the tower 20. Reasons for the selectively alternative use of plugs 35 and 37 will appear more fully hereinafter.

The hammer 28 is provided with the guide slots 40, and the weight 27 is provided with similar guide slots that are embodied in the bracket 41 that is attachable to the weight 27 by its screw threaded engagement with the adaptor plug 29, as illustrated in Fig. 5. The lugs 42 extend outwardly from the bracket 41 to constitute the guide slots for weight 27. The bracket 41 and the adaptor plug 29 are standard equipment adapted to be attached to different weights 27 alternatively, and constitute a portion of the total mass of the weight contained in the specimen assembly 25 at one end of the specimen 26.

A spacer 43 is disposed between the weight 27 and the tup 28 to hold them spaced apart a predetermined distance. Without the spacer 43 in the specimen assembly 25, the specimen 26 is liable to be crushed by the weight 27 and hammer 28 being driven one towards the other, and the impact of the weight 27 and hammer 28 being driven against each other would also cause energy dissipation that would detract from the accuracy of tests. The spacer 43, accordingly, serves to hold the weight 27 and hammer 28 rigidly spaced apart, and to hold the specimen assembly 25 to constitute a solid inflexible structure. In the embodiment of the disclosure, the spacer 43 constitutes a tube that encloses the specimen 26 protectively, and is attached to the weight 27 by being coupled to the adaptor plug 28 through the intermediate coupling 44. The spacer 43 is not attached to the hammer 28, but is preferably positioned in the specimen assembly 25 to abut against the hammer 28 as shown.

Tower structure

The tower 20, Figs. 1 and 2, comprises a framework of upright corners 45 and connecting transverse struts 46, this framework being supported on legs 47 which set on the floor 48. The tower 20 defines a vertical path within the bounds of the corners 45 for the specimen assembly 25.

A pair of tracks 50, 51 are attached to the framework of the tower 20 in any suitable manner to extend lengthwise thereof, and are positioned at respective opposite sides thereof. Tracks 50 and 51 support the respective rails 52 and 53, the rails being thereby positioned with their heads 55 disposed in opposed relationship and directed towards each other into space from opposite sides of the tower 20. See Fig. 2. Suitable liners 56, clips 57 and bolts 58 are provided to attach the rails 52 and 53 to their respective foundation tracks 50 and 51.

The rails 52 and 53 confine the specimen assembly 25 within the tower and define the path along which its travel is directed. A straight-line path in a vertically downward direction is preferred, and accordingly the rails 52 and 53 are positioned vertically in the vertical tower 20. The heads 55 of the rails 52, 53 engage the guide slots 40 of the hammer 28, and engage similar guide slots for the weight 27 that are embodied in the lugs 42 of bracket 41.

The practice is to position the specimen assembly 25 oriented with the weight 27 directed downwardly, engagement between the guideways 55 and slots 40 of hammer 28 and similar slots of brackets 41 for the weight 27 serving to confine the specimen assembly to this predetermined orientation. The downwardly directed orientation of the weight 27 is maintained during any travel of the specimen assembly 25 either upwardly or downwardly in tower 20, and when the specimen assembly 25 is dropped to test the material of specimen 26, the weight 27 travels in advance position with the hammer 28 trailing behind.

A section 60, Fig. 1, of the track 51 and companion rail 53 is constructed removable, for positioning the specimen assembly 25 into, and removing it from, its vertical path within the tower 20.

Bracket 61 is attached to a conveniently located transverse strut 46, and projects downwardly as seen in Figs. 3 and 4. A length 63 of rail is attached to companion length 62 of track by means of liners 56, clips 57 and bolts 58, and this assembly constitutes the removable section 60, which is suspended from bracket 61 to pivot on pin 64 in a direction away from opposite rail 52 and upwardly. When section 60 is swung downwardly into position for confining specimen assembly 25, the head 55 of its rail length 63 becomes positioned in alignment with the head 55 of rail 53, to complete the length of the guideway 55 of rail 53 coextensive with and opposed to the opposite guideway 55 of rail 52.

The removable section 60, as seen in Fig. 1, is positioned between two adjacent transverse struts 46 to extend upwardly from the deck 65 and above the level thereof, the deck 65 being located at a height in the tower 20 above the anvil 21 conveniently for an operator to position a specimen assembly 25 in its path of travel within the tower. When an operator, standing on deck 65, swings the removable section 60 manually in a direction outwardly away from the opposite rail 52 and upwardly, a gap is formed in the track 51 and rail 53 that is large enough to accommodate the specimen assembly 25. The operator can then move the specimen assembly 25 through the gap to position the slots 40 and of lugs 42 on one side of the specimen assembly in engagement with the guideway 55 of rail 52, after which he swings the section 60 downwardly to position the head 55 of rail length 63 into engagement with the guide slots on the other side of the specimen assembly 25. This closes the gap in the guideway 55 of rail 53, thereby confining the specimen assembly 25 to travel in its predetermined path, and forming opposed and opposite guideways 55 that are continuous and coextensive throughout its path of travel upwardly and downwardly in tower 20.

The bracket 66 is provided to project upwardly from the transverse strut 46 that is located adjacent to the lowermost end of the removable section 60, and comprises the upwardly projecting abutment stops 67. Attached to the track length 62 by welding or the like suitable means is the member comprising the tongues 68 that project laterally into position overhanging respective abutment stops 67. When the removable section 60 is placed in its downward position to close the gap in rail 53, the tongues 68 engage the abutment stops 67 and operate to locate the head 55 of rail length 63 in alignment with the head 55 of rail 53. Latches 69 are manually operable to clamp the tongues 68 against abutment plates 67.

The anvil

The anvil 21 rests on a massive base 70, Figs. 1, 9 and 10, that comprises one or more blocks of concrete or the like structural foundation material which set on the floor 48. The anvil is penetrated with an aperture 71 that lies in the vertical path of the specimen assembly 25, and which is large enough to permit the weight 27 to pass through it. The striking surface of the anvil 21, under preferred structure shown, is embodied in the striking pieces 72 which are attached to the anvil in any suitable manner to be removable therefrom for their replacement and repair. The striking pieces 72 lie on the top surface of the anvil 21 and extend towards each other to project beyond opposite edges of the aperture 71 whereby it is constricted so that the hammer 28 cannot enter it. See Fig. 10. The hammer 28 is provided for the purpose with the lateral projections 73, Fig. 6, and these embody bottom striking surfaces adapted to overhang and strike the pieces 72 of the anvil 21 when the specimen assembly 25 is dropped in the tower 20. Lateral projections 73 extend from the hammer 28 opposite each other and displaced 90° with reference to the guide slots 40.

Under guidance of the slots of lugs 42 in engagement with rail heads 55, the weight 27 is confined to a path in which it misses the striking pieces 72 of the anvil 21, and passes into the aperture 71 thereof, the bracket 41 also being contoured to enter the aperture 71 of anvil 21 without contacting the striking pieces 72 thereof.

Because the specimen assembly 25 is oriented with the weight 27 directed downwardly to travel in advance of the hammer 28, when it reaches the anvil 21 by being dropped, the trailing end of specimen 26 is arrested by the striker projections 73 of the hammer 28 striking the pieces 72 of anvil 21. The weight 27 continues to travel downwardly under its momentum, and thereby applies tensile stress to the specimen 26. The hammer 28 rebounds upwardly from the anvil 21, and thereby applies a tensile stress to specimen 26 that is opposite the stress applied by weight 27.

The concrete base 70 is apertured at 74, the aperture 74 being continuous and in line with the aperture 71 of anvil 21. Rails 52 and 53 embodying guideways 55 are extended through aperture 71 into the aperture 74 of the base 70, and thereby hold the weight 27 confined to its predetermined path after specimen 26 is ruptured, and thereafter until travel of the weight 27 is arrested. Brackets 76 and 77 are positioned rigidly in the aperture 74 of base 70 to hold the lowermost ends of the rails 52 and 53 firmly in position and to steady them against the impact shock of the tests. After rupture of the specimen 26, the hammer 28 with one piece of the ruptured specimen attached thereto comes to rest on the anvil 21.

The shock absorber

The cement base 70 sets on the floor 48, which is provided with a cavity 79 disposed in line with the path of travel of the weight 27 through apertures 71 and 74 respectively of anvil 21 and base 70. The cavity 79 contains the shock absorber 80 that operates to brake the fall of the weight 27 and the ruptured piece of the specimen 26 that is attached to it. The shock absorber 80 is supported by the brackets 81 which are seated rigidly in the cavity 79 as shown in Figs. 9 and 10, the shock absorber being held by the brackets in alignment with the falling weight 27 and in position to receive and absorb the impact thereof.

The shock absorber 80 is of the hydraulic type and comprises a cylinder 82 that is disposed in line with the path of travel of the specimen assembly 25 as defined by the guideways 55. A piston or plunger 83 rides in the cylinder 82. Plunger rod 84 is attached to plunger 83 and projects upwardly therefrom through the end or head 85 of the cylinder 82 to a position between the guideways 55 somewhat upwardly of their lower ends. See Figs. 9, 10 and 11.

An abutment head 88 is attached to the end of the plunger rod 84 at its upper end, and comprises the laterally projecting lugs 89 that form oppositely directed slots which engage the respective opposite guideways 55 and hold the abutment head 88 in the path of travel of the weight 27.

The abutment head 88 comprising a downwardly directed socket 90, Fig. 11, that contains the end piece 91 which is attached to the plunger rod 84 at its end. A buffer block 92, of wood or other suitable shock absorbing material, is also contained in the socket 90 interposed between the abutment head 88 and the end piece 91. The abutment head 88 in addition comprises the upwardly directed socket 93 which contains the similar buffer block 94 in position to be struck by the falling weight 27.

The plunger 83 is backed in the cylinder 82 by the compression spring 95, which is enclosed within the cylinder wall and extends from the plunger 83 at its one end to the cylinder end 96 at its other in seating engagement with each. The spring 95 operates to urge the plunger 83 upwardly to project its abutment head 88 to its extended position illustrated in Fig. 10.

A fluid reservoir 100 is attached to the top of the cylinder 82 exteriorly thereof. A riser extends from the cylinder 82 below the plunger 83 to the reservoir 100. The riser comprises the standpipe 101 that enters the reservoir from below, the tube or pipe 102 that projects upwardly into the cylinder 82 for a predetermined distance through its lower end or head 96, and an 180° elbow connecting the pipe 102 with the standpipe 101 at their lower ends. Fluid is able to flow from the reservoir 100 into the cylinder cavity below the plunger 83 through the riser 101, 102, 103 when the plunger 83 moves upwardly in cylinder 82. The passage 104 in the cylinder wall enables fluid to be scavenged out of the cavity in the cylinder 82 above the plunger 83 into the reservoir 100, and the longitudinal slot 105 in the cylinder wall intersects with the passage 104 to prevent fluid from being trapped in the cylinder 82 above the passage 104 when the plunger 83 approaches the top of its stroke. The reservoir 100 is provided with a filling plug 106, and a drain plug 107, the latter serving to determine the level of fluid supply in the reservoir.

The pipe 102 projects upwardly into the cylinder 82 to a predetermined height. The tapered needle 108 is attached to the plunger 83 to project downwardly therefrom into the end of the pipe 102, and in this position the needle 108 constricts the passage that extends from the cavity of cylinder 82 below the plunger 83 through pipe 102, elbow 103 and riser 101 to reservoir 100. When the plunger 83 is in its uppermost position, the passage into the pipe 102 is open to its fullest extent. As the plunger 83 moves downwardly in the cylinder 82, the cross-sectional area of the needle 108 becomes progressively greater proximate to the end of the pipe 102, and the needle 108 thereby operates as a valve that restricts the passage into the pipe 102 in progressively increasing increments.

When a specimen 26 becomes ruptured, the weight 27 with the attached portion of the ruptured specimen 26 continues to fall until it strikes the buffer block 94 of the abutment head 88. The impact drives the plunger 83 downwardly in cylinder 82 against action of the spring 95, to thereby absorb shock of impact of the weight 27.

Downward travel of plunger 83 operates to actuate fluid through the pipe 102, from which the fluid flows through elbow 103 and standpipe 101 into the reservoir 100. Fluid also flows from reservoir 100 through passage 104 into the cavity of cylinder 82 above the plunger 83, which operates in the manner of a pump sucker to draw fluid into the upper end of the cylinder 82. The standpipe 101 provides a fluid head, and the work of lifting fluid through the standpipe 101 into the reservoir 100 operates opposed to the plunger 83 to repel its travel in the downward direction. This provides a hydraulic second medium for absorbing shock of the falling weight 27.

The progressively increasing effective area of the needle 108 proximate to the upper end of pipe 102 incident to downward travel of the plunger 83 operates to decrease the area of the fluid passage into the pipe 102 progressively, and thereby serves to increase the resistance to fluid flow progressively with the downward travel of the plunger 83. Travel of the weight 27 is thereby retarded hydraulically in magnitudes that increase progressively with the downward travel of the abutment head 88. The valve of needle 108 operates to increase resistance to travel of the plunger 83 in increments that increase progressively as the velocity of the weight 27 is decreased, and therefore as the shock of impact of the weight 27 against the buffer block 94 becomes absorbed and reduced and accordingly less violent.

The distance that the weight 27 is required to travel after rupture of specimen 26 and until it is brought to a stop is greatly reduced by the hereinbefore described shock absorber of the present invention.

When the weight 27 strikes the buffer block 94, and the plunger 83 is thereby driven downwardly, downward travel of the plunger 83 is arrested and it is brought to a stop by the combined action of the several retarding mediums hereinbefore described before the needle 108 has travelled far enough to close the passage into the pipe 102 completely. After the weight 27 travels to its extreme position in a downward direction, it is raised slowly by action of the spring 95 until the weight 27 and the spring 95 are brought into counterbalance.

Specimen lifting mechanism

An elevator is preferably provided for lifting the specimen assembly 25 in the tower 20, the elevator being indicated generally at 110 in Figs. 12 and 13, and being illustrated in detail in Figs. 5 and 8.

Elevator 110 comprises the sheave 111 over which the cable 112 passes and extends upwardly in the tower 20. At its one end the cable 112 is attached as at 114 to a stationary structure of the tower 20, Fig. 12, and extends away from the attachment 114 over the idler sheaves 115 and 116 to the elevator sheave 111. The cable 112 extends away from the elevator sheave 111 in the other direction over similar idler sheaves 117 and 118 to the drum 119 of a winch or other suitable hoisting device. When the drum 119 is rotated to wind the cable 112, the elevator 110 is raised in the tower 20.

The elevator sheave 111, Figs. 5 and 8, is mounted rotatably in the frame 120 that connects the upper platform 121 of the elevator 110 with its lower cross piece 122. The platform 121 and cross piece 122 are each extended to include guide slots, which engage the guideways 55 and operate to guide the elevator 110 in its travel up or down in the tower 20.

The lower cross piece 122 includes the locating block 123 on which the latching dogs 125 are mounted pivotally on pins 124 to project downwardly into position to engage the button 36 of the plug 35 of the hammer 28. The spring 126 operates to hold the dogs 125 in latching engagement with the button 36. Cam surfaces 127 of the latching dogs 125 are positioned to be engaged and actuated by the abutment pins 129 of the actuator 130, to thereby swing dogs 125 out of latching engagement with the button 36 when the actuator 130 is depressed. Straps 131, attached to the frame 120, hold the actuator 130 in place, and guide it to move in a predetermined path upwardly or downwardly for operating the latching dogs 125 to respectively engage or disengage the button 36.

Lever 132 is pivoted at 133 on the frame 120, and comprises the abutment pin 135 that projects laterally from the lever in position to engage the abutment face 136 of the actuator 130. The lever 132 is manually operable by means of its handle 134 to push the actuator 130 downwardly, and to thereby swing latching dogs 125 out of latching engagement with the button 36 of the specimen assembly 25. Spring 126 operates to move the actuator 130 upwardly when the handle 134 is released, in addition to closing the jaws of the latching dogs 125.

The described mechanism of the latching dogs 125 and its operating lever 132 serves to release the specimen assembly 25 for a test drop from any predetermined height in the tower 20 that is calculated to attain the desired impact velocity when the specimen assembly reaches the anvil 21.

Built-in release mechanism

An additional specimen release mechanism is built into the tower 20 at its top, made available for tests to be made under initial velocities to attain impact velocities higher than is attainable by free fall.

As seen in Fig. 6, the hammer 28 comprises the latching ears 140, and these are disposed displaced 90° with reference to the guide slots 40, which places the latching ears 140 in longitudinal alignment with the bosses 73 that embody the striking surfaces of the hammer. The latching ears 140 are employed for tests made using the tower contained release mechanism, in which event the plug 35 of Fig. 5 is replaced in the hammer 28 by the plug 37 of Fig. 7.

The built-in release mechanism comprises the dogs 141, Fig. 12, which are adapted to engage the latching ears 140 of the hammer 28 for supporting the specimen assembly 25. The dogs 141 are carried respectively by the parallel shafts 142, which are mounted to rotate in the bearings 143, the dogs being keyed to the shafts to rotate therewith. See also Fig. 15.

It will be noted in Fig. 12 that the latch of each dog 141 is displaced away from the vertical center planes of its shaft 142, this displacement of the several latches being towards each other. Each dog 141 comprises a cam surface 144 at its end that is adapted to coast with a cam surface 145, Fig. 6, one of which is embodied in each latching ear 140 of the hammer 28.

Downwardly directed arms 148, Figs. 15 and 16, are disposed opposite each other, and are keyed each to a shaft 142 that carries a latching dog 141. The tension spring 149 is attached at its opposite ends to the respective arms 148 and tends to pull the arms 148 towards each other. Spring 149 is strong enough to bias the arms towards each other when the dogs 141 are not supporting the specimen assembly 25, but spring 149 is not strong enough to support the weight of the specimen assembly. Spring 149 holds the dogs 141 in position for their cam surfaces 144 to be engaged by companion cam surfaces 145 of the hammer 28 when the specimen assembly 25 is actuated upwardly in tower 20 towards latching engagement with the dogs.

The arms 148 are held in position to hold the dogs 141 in engagement with the latching ears 140 of hammer 28 by means of the triggers 150 and 151 which engage the arms. See Figs. 15 and 16. Triggers 150 and 151 are both keyed to the shaft 152, which lies in a vertical plane that is perpendicular to the parallel shafts 142, the shaft 152 being mounted to rotate in the bearings 153. The hand lever 154 is constructed integral with the trigger 151, and constitutes a weight that is operable to rotate the shaft 152 in the counterclockwise direction in Fig. 13, and in Figs. 15 and 16 in the clockwise direction. When it swings to its normal position of rest, the weighted handle 154 locates the triggers 150 and 151 in position for engagement with the arms 148. Arms 148 are provided with abutment faces 155 that are companion to similar abutment faces 156 with which the triggers 150, 151 are provided, the abutment faces 155 and 156 being replaceable when they wear, and being adjustably positionable relative to each other to enable precise adjustment for simultaneous release of the triggers 150 and 151.

When a test drop is to be made using the built-in release embodying the dogs 141, the specimen assembly 25 is placed on top of the elevator 110, oriented with the hammer 28 directed upwardly and the weight 27 resting on the platform 121. The elevator 110 is raised by rotating the hoisting drum 119, and when it reaches the top of the tower 20, cam surfaces 145 of the hammer 28 move into position of engagement and coaction with the cam surfaces 144 of the dogs 141. Dogs 141 are thereby deflected away from each other and they ride along the surfaces of latching ears 140 until they clear, whereupon the dogs 141 are actuated by springs 149 into position for latching engagement with the ears 140 of hammer 28.

The triggers 150 and 151 must be out of the way of the arms 148 during their movement away from each other incident to the dogs 141 moving away from each other. Accordingly, the handle 154 is actuated to the right in Fig. 15 and held there while the specimen assembly 25 is being raised to position for engagement of the ears 140 by the dogs 141, and when the dogs 141 fall into position for latching engagement with the ears 140, the handle 154 is released to position the triggers 150 and 151 for holding engagement with the arms 148.

The elevator 110 is now lowered, leaving the specimen assembly 25 suspended from the dogs 141. The elevator 110 is lowered to the removable section 60, Fig. 1, and is removed from the path of the specimen assembly 25 through the gap of section 60 in rail 53.

The test is made by swinging the hand lever 154 to the right in Fig. 15 to position the triggers 150, 151 out of holding engagement with the arms 148.

The weight of specimen assembly 25 acts through the lever arms provided by the dogs 141 being offset from the vertical center-planes of their shafts, and operates to drive the dogs 141 away from each other out of latching engagement with the hammer 28. The weight of the specimen assembly 25 is excessively sufficient to rotate the dogs 141 on the axes of their shafts 142 against action of the spring 149, and resistance to the fall of the specimen assembly 25 by the triggers 150, 151 being tripped by actuation of the hand lever 154 is negligible and insufficient to seriously affect the accuracy of tests.

Fall of the specimen assembly 25 operates to drive the arms 148 apart with considerable violence. A buffer 157, Fig. 16, is therefore positioned in the path of each abutment face 155 of each arm 148, and these serve to absorb the shock of the arms 148 being driven apart. Each buffer 157 is backed by a spring contained in its housing 158.

The built in release mechanism is carried by the base 160 which is mounted in the tower 20, for example, by being attached to suitably positioned transverse struts 46 thereof. A deck 161, Fig. 1, and shown also in Figs. 12 and 13, is provided at a suitable level relative to the strut 46 that supports the base 160 to enable an operator or a crew of operators to perform the various manual operations that are required at the top of the tower 20 pursuant to making a test with the apparatus of the present invention.

Specimen assembly drive

The driving engine 22 is positioned at the top of the tower 20, as seen in Fig. 1, and is operable for tests that are made from the top of the tower. The driving engine 22 operates to develop a predetermined initial velocity for a specimen assembly 25, thereby to attain a predetermined impact velocity at the anvil 21 which is higher than is attainable by free fall from the top of the tower 20.

The driving engine 22 is supported by the base 160, Figs. 12, 13 and 14, and comprises a bottom end plate 165 that sets on top of the base 160, and is attached thereto by cap screws 166 or the like. A cylinder 167, housed in the sleeve 168, sets on and projects upwardly from the bottom end plate 165, and is clamped in position between the bottom end plate and the opposite top end plate 169 by means of draw bolts 170 or the like.

Piston 171 rides in the cylinder 167, and includes the piston rod 172 that projects downwardly out of the cylinder end 173, which is attached to the bottom end plate 160 as shown in Fig. 14. At its end remote from the piston 171, the piston rod 172 comprises the abutment tip 174 that is positioned for engagement with the specimen assembly 25. The plug 37, Fig. 7, is employed in the hammer 28 for the purpose, and the abutment face 38 of the plug is adapted to be engaged by the abutment tip 174 when the specimen assembly 25 is supported by the latching dogs 141 in the manner illustrated in Fig. 12.

The accumulator 175 is positioned at the end of the cylinder 167 remote from the bottom end plate 165, and is constructed integral with the top end plate 169 as shown in Fig. 13, the accumulator 175 being thereby attached to the cylinder 20. The head 176 is attached to the accumulator 175 by means of bolts 177 or the like, and serves to close the accumulator. Fluid under pressure, derived from any suitable source, is supplied to the accumulator 175, through the line 178, the valve 179 being provided to control the fluid pressure in the accumulator 175 to any desired magnitude as determined by the gage 180. Under preferred practice of the disclosed embodiment, compressed air is the pressure fluid medium employed.

The end of the cylinder 167 in advance of the piston 171, as seen in Fig. 14, is open to the atmosphere for scavenging through the passage 181 in the bottom end plate 165, the cylinder end 173 including the passage 182 that provides communication between the interior of cylinder 167 and the passage 181. The adjustment valve 183 is operable to control the rate of fluid flow to the atmosphere through passage 182 and the exhaust aperture 184, and this serves to control back pressure within cylinder 167 to a predetermined magnitude for retarding the piston 171 after it has operated to drive the specimen assembly 25. Back pressure is controlled by valve 183 to a magnitude that retards piston 171 and brings it to a stop before it travels far enough to strike the bushing 185 that fits in the cylinder end 173.

When a test is to be made from the top of the tower 20, the abutment face 38 of the plug 37 engages the abutment tip 174 of the piston rod 172, and the piston 171 is thereby actuated upwardly in the cylinder 167 by the operation of latching the specimen assembly 25 onto the dogs 141 of the release mechanism. The accumulator 175 is now placed under the predetermined desired pressure as read on the gage 180 that is calculated to provide the desired impact velocity at the anvil 21, valve 179 being operated for the purpose. This sets the specimen assembly 25 ready for making the test, which is done by swinging the hand lever 154 in the clockwise direction in Fig. 13 to release the triggers 150 and 151, Fig. 16, from the arms 148 in the manner hereinbefore described.

Operation

When a test is to be made from any height in the tower 20 less than the top thereof, the hammer 28 is provided with the plug 35, Figs. 5 and 8, that includes the button 36. The specimen assembly 25 then is suspended to project downwardly from the bottom of the elevator 110, by the latching dogs 125 thereof engaging the button 36. In this condition the specimen assembly 25 is lifted by means of the elevator 110 to a predetermined height in the tower 20 that is calculated to provide the desired impact velocity from free fall at anvil 21. The specimen assembly 25 is there released to make the test drop by manual operation of the handle 134 of lever 132 which operates to release dogs 125 from the button 36.

When a test is to be made from the top of the tower 20, the hammer 28 is provided with the plug 37, Fig. 7, that comprises the abutment face 38. The specimen assembly 25 is set on top of the platform 121 of the elevator 110, and is lifted thereby to the top of the tower 20 where it is attached to the dogs 141 by their engaging the latching ears 140 of the hammer 28. The elevator 110 is then lowered to the bottom of the tower 20 and removed from the guideways 55 through the opening formed by the removable section 60, Figs. 3 and 4, being swung outwardly.

The accumulator 175 is placed under whatever pressure is required to provide the initial velocity required to attain the desired impact velocity, and the specimen assembly 25 is then released for the test by the hand lever 154 being moved clockwise in Fig. 13, in the manner hereinbefore described.

The apparatus as disclosed in the present application is adapted to make elongation tests under impact tensile stress. In application, Electrical Apparatus for Testing Materials, Ser. No. 617,902, filed September 21, 1945, by me as coinventor with Edward C. Taylor, now Patent No. 2,475,614, filed July 12, 1949, there is disclosed suitable apparatus for determining tensile stress of impact tests made on the machine of the present application. In application, Spark Recorder, Ser. No. 617,901, filed September 21, 1945, by me as coinventor with Edward C. Taylor and Fred Lager, now Patent No. 2,503,307, April 11, 1950, there is disclosed an apparatus suitable for determining the energy absorbed in making impact tests with the apparatus of the present application.

The disclosure of the present application presents one

I claim:

1. In apparatus for testing materials, an upright tower, a specimen assembly comprising a mass of predetermined magnitude rigidly attached to a specimen of the material being tested at one of its ends, mechanism operable to release the specimen assembly to fall with the mass in advance of the specimen selectively from any of a plurality of predetermined heights in the tower, a driving engine operable when the specimen is released to drive it at a predetermined initial velocity for attaining a predetermined higher velocity when it reaches the base of the tower than is attainable by free fall, and means at the base of the tower to arrest the trailing end of the falling specimen assembly.

2. In apparatus for testing materials, an upright tower, a specimen assembly comprising a mass of predetermined magnitude rigidly attached to a specimen of the material being tested at one of its ends, a device for dropping the specimen assembly selectively from any of a plurality of predetermined heights in the tower with the mass directed downwardly, release mechanism, a driving engine operable by operation of the release mechanism to drive the specimen assembly at a predetermined initial velocity for attaining a predetermined higher velocity when it reaches the base of the tower than is attainable by free fall, and means at the base of the tower to arrest the trailing end of the falling specimen assembly.

3. In apparatus for testing materials, an upright tower, an anvil at the base of the tower, a specimen assembly comprising a mass of predetermined magnitude rigidly attached to each of opposite ends of a specimen of the material being tested, mechanism operable to drop the specimen assembly selectively from any of a plurality of predetermined heights in the tower to fall to the anvil with one mass in advance and the other mass trailing, a driving engine at the top of the tower and a release mechanism for the specimen assembly associated therewith, the driving engine being operable against the trailing mass when the specimen assembly is released to drive it at a predetermined initial velocity for attaining a predetermined higher velocity when it reaches the anvil than is attainable by free fall, and guideways operable to guide the leading mass to miss the anvil and the trailing mass to strike the anvil.

4. In apparatus for testing materials, an upright tower, an anvil at the base of the tower, a specimen assembly comprising a mass of predetermined magnitude rigidly attached to each of opposite ends of a specimen of the material being tested, an elevator operable to lift the specimen assembly with one mass directed downwardly and the other mass directed upwardly to any of a plurality of predetermined heights in the tower above the anvil, the elevator comprising a release mechanism to release the specimen assembly for free fall from the predetermined height to which it is lifted by the elevator, a driving engine at the top of the tower operable against the uppermost mass to drive the specimen assembly at a predetermined initial velocity for attaining a predetermined higher velocity when it reaches the anvil than is attainable by free fall, the holding mechanism for the specimen assembly operating, to hold the driving engine against operation the holding mechanism comprising a release mechanism for the specimen assembly to enable the driving engine to operate when the release mechanism is operated.

5. In apparatus for testing materials, an upright tower, upright guide rails secured inside the tower along its length, a rigid specimen assembly comprising a mass of predetermined magnitude rigidly attached at one end of a specimen of the material to be tested, an elevator operable along the guide rails and comprising release mechanism operable to hold the specimen assembly suspended below the elevator with its mass extending downwardly, the release mechanism being operable to release the specimen assembly at any desired height to fall freely, an arresting device at the base of the tower, a device companion to the arresting device secured to the specimen at its end remote from the mass and engageable by the arresting device during fall of the specimen assembly, a shock absorber below the arresting device to break the fall of the weight, the shock absorber comprising a cylinder and a piston operable in the cylinder to retard movement of the weight by resistance of fluid flow, a valve operable by travel of the piston to increase resistance to fluid flow in increments that increase with the velocity of the weight being reduced.

6. In apparatus as defined in claim 5, the fluid of the shock absorber constituting a liquid.

7. In apparatus for testing materials, an upright tower, upright guide rails secured inside the tower along its length, a rigid specimen assembly comprising a mass of predetermined magnitude rigidly attached at one end of a specimen of the material to be tested, an elevator operable along the guide rails and comprising release mechanism operable to hold the specimen assembly suspended below the elevator with its mass extending downwardly, the release mechanism being operable to release the specimen assembly at any desired height to fall freely, an arresting device at the base of the tower, a device companion to the arresting device secured to the specimen at its end remote from the mass and engageable by the arresting device during fall of the specimen assembly, a driving engine at the top of the tower to impart a predetermined initial velocity to the specimen assembly when it is dropped therefrom.

8. In apparatus for testing materials, an upright tower, an anvil at the base of said tower, a driving engine at the top of the tower and a holding mechanism associated therewith, a rigid specimen assembly comprising a mass of predetermined magnitude attached and held rigidly to each of opposite ends of a specimen of the material being tested, an elevator operable to lift the specimen assembly to any of a plurality of predetermined heights above the anvil in the tower including the top, the elevator comprising a release mechanism to hold the specimen assembly suspended from the bottom thereof with one of the masses directed downwardly and the other mass directed upwardly, the release mechanism being operable to drop the specimen assembly for free fall from the predetermined height to which it is lifted, the downwardly directed mass leading and the upwardly directed mass trailing when the specimen assembly is dropped to fall, the elevator comprising a platform for supporting the specimen assembly upwardly of the elevator and to deliver the specimen assembly to the hold mechanism of the driving engine with the leading mass directed downwardly and the trailing mass directed upwardly, the holding mechanism comprising a release mechanism to release the specimen assembly for falling, the driving engine being operable to drive the specimen assembly at any of a plurality of predetermined initial velocities for attaining respectively several higher velocities when the specimen assembly reaches the anvil than are attainable by free fall from the top of the tower, the holding mechanism holding the specimen assembly against being driven by the driving engine, the release mechanism of the holding mechanism operating to release the specimen assembly to be driven by the driving engine.

9. In apparatus as defined in claim 7, the elevator comprising a platform at its top to support the specimen assembly above the elevator in position for engagement by the driving engine.

10. In apparatus as defined in claim 9, an additional release mechanism associated with the driving engine and positioned to engage the specimen and hold it in position of engagement with the driving engine.

11. In apparatus as defined in claim 10, the release mechanism of the driving mechanism comprising a trigger operable to hold the specimen assembly opposed to operation by the driving engine, and operable to release the specimen assembly to be driven by the driving engine.

12. To constitute a specimen assembly for making impact-tensile test of material in an impact testing machine, a mass attachable to each of opposite ends of a specimen of the material to be tested, and a spacer to hold the specimen assembly rigid and to prevent relative movement of the masses towards each other, an attachment for the spacer to secure it to one of the masses rigidly at one end of the specimen, and to hold the spacer rigidly in abutting engagement with the other mass.

13. For the specimen assembly as defined in claim 12, the spacer comprising a length of tubing embodying a screw thread at one of its ends, and the attachment comprising a screw thread companion to the screw thread of the spacer.

References Cited in the file of this patent

UNITED STATES PATENTS

| Number | Name | Date |
|---|---|---|
| 161,737 | Beardslee | Apr. 6, 1875 |
| 463,259 | Estrada | Nov. 17, 1891 |
| 720,575 | Fremont | Feb. 17, 1903 |
| 793,949 | O'Hearn | July 4, 1905 |
| 1,267,030 | Williams | May 21, 1918 |
| 1,508,391 | Greenwood | Sept. 16, 1924 |
| 1,527,409 | Hassel | Feb. 24, 1925 |
| 1,604,089 | Topfl | Oct. 19, 1926 |
| 1,604,141 | Amsler | Oct. 26, 1926 |
| 1,745,182 | Moran | Jan. 28, 1930 |
| 1,985,478 | Yuasa | Dec. 25, 1934 |
| 2,332,520 | Lucht | Oct. 26, 1943 |
| 2,362,589 | Simmons | Nov. 14, 1944 |
| 2,447,660 | Miklowitz | Aug. 24, 1948 |
| 2,475,614 | Hoppmann et al. | July 12, 1949 |
| 2,520,979 | Taylor et al. | Sept. 5, 1950 |